June 3, 1952 M. M. THIELEN 2,598,947

COMBINED TELEVISION CAMERA AND PROMPTER

Filed Feb. 11, 1950 3 Sheets-Sheet 1

INVENTOR.
MARY M. THIELEN
BY Optrolenk & Faber
ATTORNEYS

June 3, 1952 M. M. THIELEN 2,598,947

COMBINED TELEVISION CAMERA AND PROMPTER

Filed Feb. 11, 1950 3 Sheets-Sheet 2

INVENTOR.
MARY M. THIELEN

BY Ostrolenk & Faber

ATTORNEYS

COMBINED TELEVISION CAMERA AND PROMPTER

Filed Feb. 11, 1950 3 Sheets-Sheet 3

INVENTOR.
MARY M. THIELEN
BY
Ostrolenk & Faber
ATTORNEYS

Patented June 3, 1952 2,598,947

UNITED STATES PATENT OFFICE 2,598,947

COMBINED TELEVISION CAMERA AND PROMPTER

Mary M. Thielen, Scarsdale, N. Y.

Application February 11, 1950, Serial No. 143,693

13 Claims. (Cl. 178—7.1)

My invention relates to a novel method of and mechanism for controlling the broadcast of a television program, and more specifically relates to a novel method of and apparatus for constantly presenting to actors their script and controlling the rate at which the program progresses.

At present, the technique for operating a television program generally comprises utilizing a plurality of cameras which are focused on the actors for taking and broadcasting pictures of the cene; that is, televising the program.

A program director usually directs through telephonic communications each of the operators of the cameras and determines which of the camera's output shall at any moment be transmitted. This makes it necessary, however, to have each of the performers not only memorize his actions, but also all of his lines and his relative location with respect to other actors. This necessity for memorizing the script has been one of the primary factors in the well recognized costliness of a television program and indeed its apparent necessity has been one of the factors which retarded the introduction of television as a commercial project.

In the case of news commentators and many others who are not professional performers, it has been the practice heretofore to read their script, or at least notes on which their talk is based. This required them to shift their eyes from the script to the camera periodically. While this has been recognized as disconcerting and a serious disadvantage, no known solution has heretofore been available.

In many cases, precision accuracy of the spoken material is required as in the case of announcements of food and drug products regulated by the Pure Food and Drug Act. In these cases, any ad lib remarks may result in breaches of the law with serious consequences and have therefore been the cause of anxiety both on the part of the broadcast station owner and also the program producer.

My invention is directed to a means of presenting to the actor or other television performer a continuously visible script in which only the portions to be read at the particular moment are visible and in which the successive presentation of the portions of the script to be read are under control of the program director or other individual responsible for timing and direction. Essentially, my receiver contemplates placing the script on a continuous roll and mounting this continuous roll on the television camera itself, or adjacent to it, and providing appropriate driving means for moving successive portions of the roll into view. The apparatus must, of course, be so arranged that it may be readily mounted on the television camera and in such a position that it is located as closely adjacent to the particular lens of the television camera which is in use as possible in order to give the illusion of looking directly into the lens itself.

My invention also contemplates the control of the speed of operation of the continuous roll of the script thereon by a program director having a synchronized duplicate of the script in a box or other piece of apparatus on his desk. The duplicate script roll at the desk of the program director is moved in any suitable manner and may even be operated manually always in perfect synchronism.

The rate of movement of the roll at the program director's desk determines the rate of movement of the roll at the television camera. This is preferably accomplished by having the moving roll at the program director's desk drive a selsyn motor which is connected to another selsyn motor at the television camera; the latter selsyn motor in turn drives the script roll at the television camera. Thus, where as is frequently the case, three cameras are to be used for a broadcast, each of the three cameras will have a complete script roll and the apparatus on the program director's desk will also have a complete script roll. As the program director controls the rate of movement of the script roll at his desk all of the script rolls at the various television cameras will move simultaneously. Thus, wherever the actor or other performer may happen to look, he will find a moving script roll giving him the material which he is to speak or act.

The script roll may in addition to carrying the material to be read also carry stage directions, the material to be read being printed in one color and the stage directions in a contrasting color.

Where the action of the program requires that the performer look at some point not occupied by a camera, the mounting of a similar receiving unit at a point toward which he is to look will positively control his movement in accordance with the plan laid out by the program director, before the program begins. The material on the roll may be printed in characters of appropriate size and may be appropriately illuminated, and if required, magnifiers may be used at the receiving units to insure full visibility of the material.

The script roll and receiver unit for operating it may be camouflaged as book-ends behind drapes, curtains, etc. so that it will not be visible to the audience viewers.

The primary object of my invention, therefore, is the provision of a novel mechanism for constantly presenting to performers the material which they are to speak and also presenting such stage directions as may be required.

The foregoing and many other objects of my invention will become apparent in the following description and drawings in which Figure 1 is a view in perspective of the program director's control box.

Figures 1, 4:
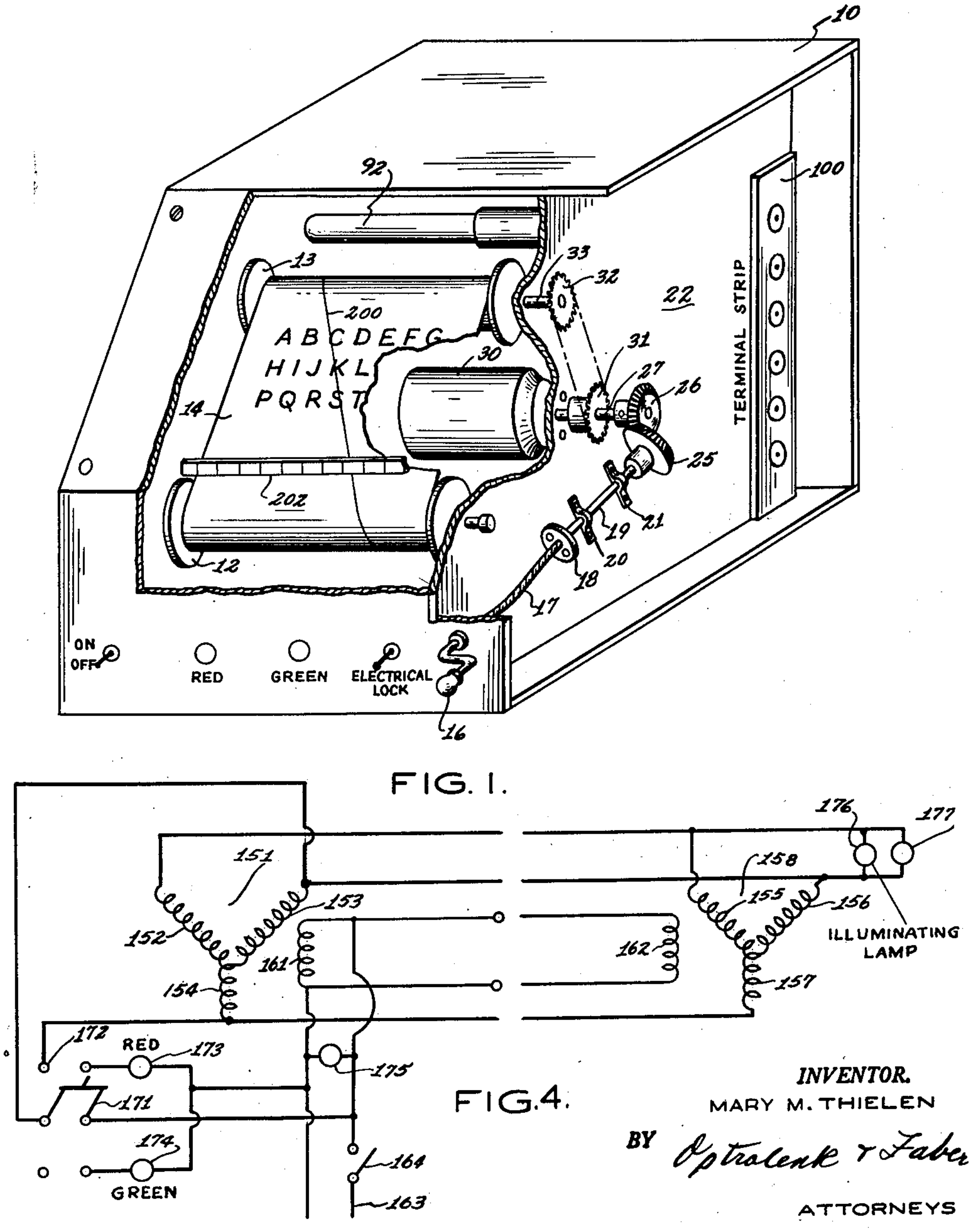
Figure 4 is a schematic electrical diagram showing one manner in which the elements may be connected.

Referring first to Figure 1, the program director is provided with the control box 10 having a supply roll spool 12 and a take-up roll spool 13, a script roll 14, having appropriate printed material thereon and mounted on the supply roll and connected to the take-up roll. Appropriate means is provided to drive the take-up roll in the embodiment shown. A crank handle 16 drives a flexible shaft 17 which is connected by coupling 18 to shaft 19 held in brackets 20 and 21 on panel 22 of the control box 10. Bevel gear 25 on shaft 19 matches with bevel gear 26 on shaft 27. Shaft 27 drives an appropriate synchronizing device hereinafter described which is preferably a selsyn motor 30.

Figure 2:
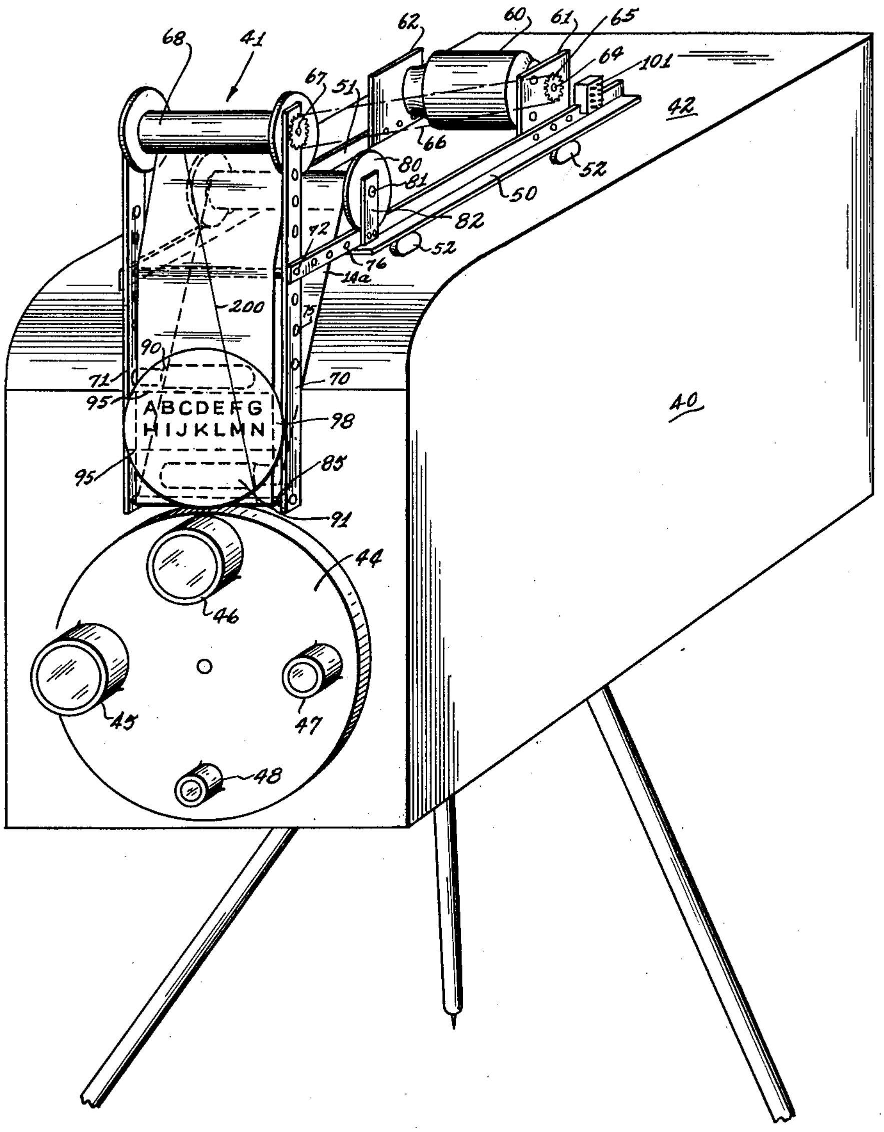
Figure 2 is a view in perspective showing my novel script control receiver mounted on one type of television camera.

Sprocket 31 on shaft 27 drives sprocket 32 which is connected by shaft 33 to the take-up roll 13. Consequently as the program director rotates handle 16, take-up roll 13 winds up the script 14 at a speed determined by the director. It will be obvious that an appropriate motor drive may be substituted for handle 16, said motor drive either comprising a variable speed motor or having a variable speed connection to the shaft 17 or 19. The speed of the drive may then be under control of the program director. At the television camera 40 of Figure 2, a receiving unit 41 is supported in any suitable manner on the top wall 42 of the casing of the television camera 40. The means 52 may simply be a pair of non-skid rubber legs or may be a positive securing means, such as a bolt, screw, clip, or strap arrangement.

A selsyn motor 60 or any suitable synchronizable drive unit is mounted between the plates 61 and 62 carried by the angle bars 50 and 51. The shaft 64 of the drive unit 60 has a sprocket 65 connected by chain 66 to sprocket 67 on the take-up roll 68 of the receiving unit 41. The take-up roll 68 is mounted between the parallel vertical bars 70 and 71 which are secured in any suitable manner as by the rod 72 passing through registering openings in the bars 70 and 50 and 71 and 51 respectively, to the bars 50 and 51. The rod 72 also guides paper in a vertical plane for viewing.

The script 14a is carried down under the guide roll 85 and is rotatably mounted at the lower end of 70 and 71, then up between bars 70 and 71 over the securement shaft 72 which acts as a guide rod, and on to the take-up roll 68. Consequently the script is moved upwardly just above lens 46 which happens to be the lens to be televising the program by the apparatus herein described.

Since the motors 30 and 60 are so arranged that they are synchronous with each other, the rate of movement of the take-up roll shaft 33 at the control unit 10 is duplicated exactly at the receiving unit 41 through take-up roll 68. Where appropriate illumination is required, then the lamp filament light bulbs 90 and 91 may be carried by the bars 70 and 71 just above and below the visible portion of the script 14a. Similarly, a lamp filament bulb 92 may be mounted in the control box. An appropriate mask indicated by the dotted lines at 95 may be mounted across the front surface of the bars 70 and 71 so that the only portion of the script visible is that between the lines 95—95. This mask may be a portion of the casing where a casing or housing is used in the unit, although the elimination of the casing makes the operation of the unit, especially the placement and removal of the rolls, a simple matter.

Where required also a magnifying lens 98 may be carried between the bars 70 and 71 in front of the script 14a and through in front of or in back of the mask as defined by dotted lines 95—95.

Figure 3:
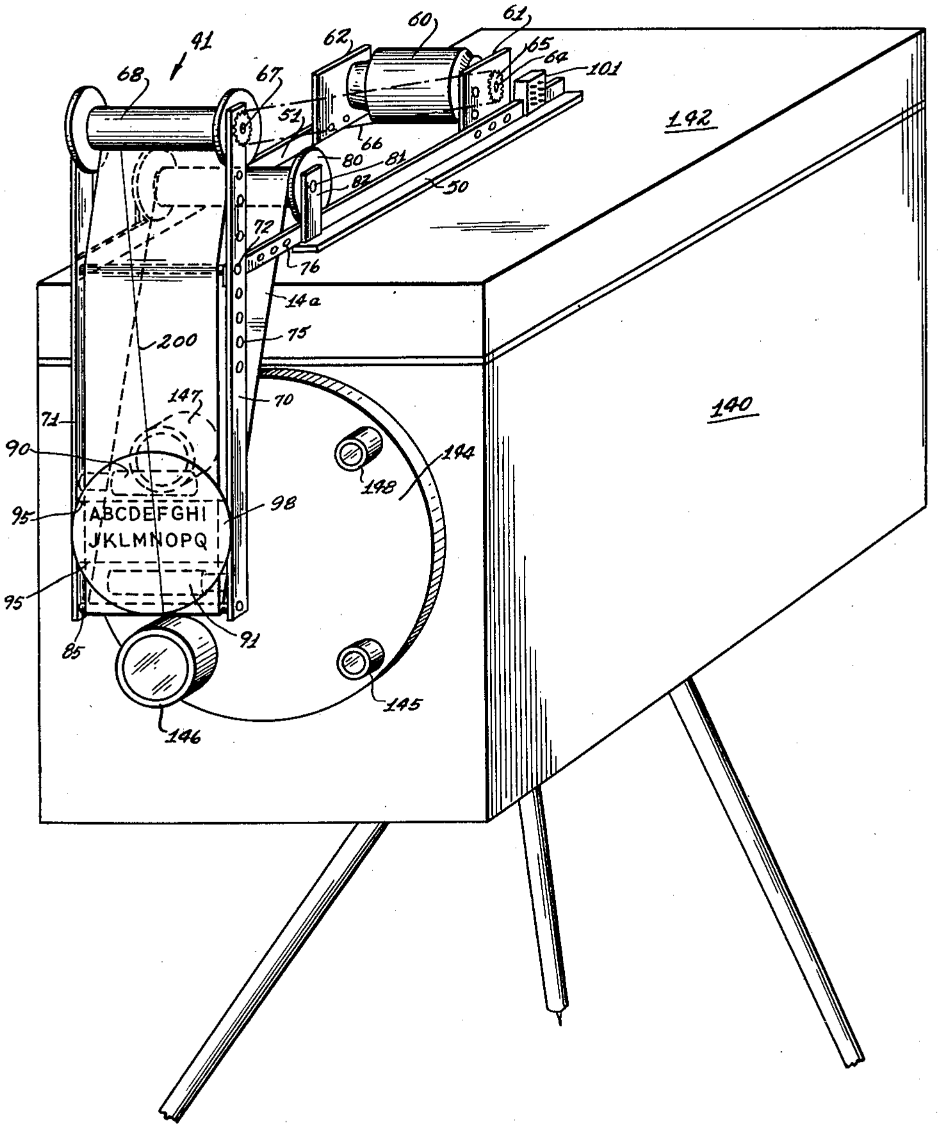
Figure 3 is a view corresponding to that of Figure 2 showing the script control receiving unit mounted on another type of television camera.

In Figure 3, I have shown the mounting of my unit on another type of camera 140, having a top wall 142 and a lens turret 144 with lenses 145, 146, 147 and 148. This type of camera 140 is one wherein the particular lens televising the program is at the lower left in the position occupied by lens 146. In this case the unit 41 is moved forward at the top wall 142 so that the script material extends slightly forward of the lens 145—148 so that the turret 144 may be revolved. The same unit 41 is shown here in use as in Figure 2 with the connection between bars 70 and 50 and 71 and 51 being adjusted for the different type of lens arrangement. The control unit is provided with a terminal block 100 and the receiving unit also has a terminal block 101.

One method of connecting the elements for simultaneous operation is shown in Figure 4. In Figure 4, I have shown schematically the selsyn system which may be applied in carrying out my invention. The selsyn transmitter is shown at 151 and comprises the usual three phase windings 152, 153 and 154, connected respectively to the three phases 155, 156, 157 at the receiving selsyn 158. A winding 161 at the transmitting end and a winding 162 at the receiving end are energized from a source of power 163 when the switch 164 is closed.

As is well known in the art, when the windings 152 to 154 are rotated relative to winding 161, a voltage is induced therein which will produce a corresponding angular movement of the windings 155 to 157 relative to winding 162. The source of power 163 is connected to a double pole, double throw switch 171 on closing switch 164. Initially, the recorded material is inserted on the transmitter and receiver drum. With the switch 164 closed, the switch 171 is moved to its upper position at which contact 172 is engaged. In this position windings 153 and 154 at the transmitter and windings 156 and 157 at the receiver are short-circuited and the increased torque resulting therefrom will cause the rotors 161 and 162 to find their zero in-phase position in which it is electrically locked so that angular rotation of either shaft is possible only by overcoming the maximum torque possible of the selsyn motors. This arrangement facilitates the operation of placing the start of the script rolls on both transmitter and receiver units in exactly the same relative zero position. With the switch 171 in its upper position, an obvious energizing circuit is completed for the red lamp 173, indicating that the apparatus is not in operation but has been prepared for operation.

With the recorded material now in place and in proper phase alignment at both the transmitter and receiver units, the switch 131 is thrown into its lowermost position at which the by-pass circuit for the windings 153, 154, 156 and 157 is opened and these windings are now in operation condition. At the same time an obvious energizing circuit is completed for lamp 174 indicating readiness for the regular operation of the transmitter and receiver units.

Although in the above, I have illustrated the use of a selsyn for pending synchronous operations, it will be clear that I may use any well known means for achieving synchronous movement between the transmitter and receiver.

The transmitter program material will be marked along the margin with the broadcast time when the corresponding adjacent portion should be completed thus providing a control of the rate at which the program is being completed and which thus acts as a further guide to the broadcaster.

By this means it will be seen that a simplified method is provided to control a television program continuously. By mounting receiving units 41 at various points in the studio and particularly on each television camera, the necessity for notes of any kind is dispensed with. In addition, the need for memorizing and rehearsing memorized scripts is obviated. In a news broadcast, no rehearsal at all will be necessary since the script and the stage directions thereon may be read as required.

The spacing or phrasing of the announcer may also be controlled on the script roll. In the case of a program such as a play requiring physical movement, only one or two rehearsals are required by my system in order to establish the general type of movement and the mood of the program in the minds of the actors. The lines to be spoken and the stage directions on the script roll will then completely control the action and prevent mistakes which frequently occur in memorized performances. The cost of the entire production will thereby be greatly reduced.

As previously pointed out, where the action requires that the actor look at some point away from the camera, the point at which he will look will be fully controlled by the placement of the receiving unit at that point. While my invention is directed primarily to television productions and commercial announcements, it will be obvious that the same method and apparatus is as readily adaptable to motion picture production as well as stage productions. The essential element is the inter-connection or the synchronized arrangement between the control box and the receiving units so that the entire production may be controlled.

In addition, a diagonal line 200 may be placed on each of the script rolls 14 and 14a or if desired, the diagonal line may be placed only on the script roll 14 of Figure 1. This line may be read against the time scale 202 at the control unit 10 of Figure 1 and will indicate the elapsed time from the beginning of the script to the point then being read as well as the time then being read and the end of the script. Thus, in a program of, for instance, 15 minutes' duration, the diagonal line 200 will be ruled from the upper left-hand corner to the lower right-hand corner of the script strip. The mid-point of the program, that is, 7½ minutes of elapsed time, should occur therefore at the point where the diagonal line has reached the longitudinal center of the script strip. The apparent movement of the diagonal line 200 across the scale 202 will then indicate appropriate timing to the actor, announcer or program director who may then control the movement of the script 14 at both the control unit and the receiving units.

In the foregoing I have described my invention only with a preferred illustrative embodiment thereto. Since many variations and modifications of my invention should now be obvious to those skilled in the art, I prefer to be bound not by the specific disclosures herein contained but only by the appended claims.

I claim:

1. A television program control system comprising a transmitter control box, a plurality of television cameras, and a plurality of receiving units; each receiving unit being mounted on a television camera; a script roll in said control box; and a similar script roll in each of said receiving units; apparatus for moving successive portions of the script roll in the control box into view; and means at the control box driven at a speed proportional to the rate of movement of the script roll in the control box; a driving member at each receiving unit moving successive portions of the script roll thereof into view adjacent an operating lens thereof; said operating lens being mounted on each of said television cameras; and a synchronizing connection between said driven means and each driving member to move the script roll at each receiving unit at a rate identical with that of the script roll in the control box.

2. A television program control system comprising a transmitter control box, a plurality of television cameras, and a plurality of receiving units; each receiving unit being mounted on a television camera; a script roll in said control box; and a similar script roll in each of said receiving units; apparatus for moving successive portions of the script roll in the control box into view; and means at the control box driven at a speed proportional to the rate of movement of the script roll in the control box; a driving member at each receiving unit moving successive portions of the script roll thereof into view adjacent an operating lens thereof; said operating lens being mounted on each of said television cameras; and a synchronizing connection between said driven means and each driving member to move the script roll at each receiving unit at a rate identical with that of the script roll in the control box; each receiving unit comprising a horizontal base supportable at the top of a television camera and projecting beyond the front thereof; the driving member being carried by said base; a script take-up roll connected to said driving member and mounted on said base; a script supply roll connected to said base; and a front vertical frame extending downwardly in front of the camera and adjacent the lens in use; said frame comprising guide means for said moving script in front of the camera between the supply and take-up rolls.

3. A television program control system comprising a transmitter control box, a plurality of television cameras, and a plurality of receiving units; each receiving unit being mounted on a television camera; a script roll in said control box; and a similar script roll in each of said receiving units; apparatus for moving successive portions of the script roll in the control box into view; and means at the control box driven at a speed proportional to the rate of movement of the script roll in the control box; a driving member at each receiving unit moving successive portions of the script roll thereof into view adjacent an operating lens thereof; said operating lens being mounted on each of said television cameras; and a synchronizing connection between said driven means and each driving member to move the script roll at each receiving unit at a rate identical with that of the script roll in the control box; each receiving unit comprising a horizontal base supportable at the top of a television camera and projecting beyond the front thereof; the driving member being carried by said base; a script take-up roll connected to said driving member and mounted on said base; a script supply roll connected to said base; and a front vertical frame extending downwardly in front of the camera and adjacent the lens in use; said frame comprising guide means for said moving script in front of the camera between the supply and take-up rolls, and a magnifier carried by said front vertical frame in front of said script.

4. A television program control system comprising a transmitter control box, a plurality of television cameras, and a plurality of receiving units; each receiving unit being mounted on a television camera; a script roll in said control box; and a similar script roll in each of said receiving units; apparatus for moving successive portions of the script roll in the control box into view; and means at the control box driven at a speed proportional to the rate of movement of the script roll in the control box; a driving member at each receiving unit moving successive portions of the script roll thereof into view adjacent an operating lens thereof; said operating lens being mounted on each of said television cameras; and a synchronizing connection between said driven means and each driving member to move the script roll at each receiving unit at a rate identical with that of the script roll in the control box; each receiving unit comprising a horizontal base supportable at the top of a television camera and projecting beyond the front thereof; the driving member being carried by said base; a script take-up roll connected to said driving member and mounted on said base; a script supply roll connected to said base; and a front vertical frame extending downwardly in front of the camera and adjacent the lens in use; said frame comprising guide means for said moving script in front of the camera between the supply and take-up rolls, and a mask carried by said front vertical frame in front of said script; said mask having an opening defining the area of the moving script to be read.

5. A television program control system comprising a transmitter control box, a plurality of television cameras, and a plurality of receiving units; each receiving unit being mounted on a television camera; a script roll in said control box; and a similar script roll in each of said receiving units; apparatus for moving successive portions of the script roll in the control box into view; and means at the control box driven at a speed proportional to the rate of movement of the script roll in the control box; a driving member at each receiving unit moving successive portions of the script roll thereof into view adjacent an operating lens thereof; said operating lens being mounted on each of said television cameras; and a synchronizing connection between said driven means and each driving member to move the script roll at each receiving unit at a rate identical with that of the script roll in the control box; each receiving unit comprising a horizontal base supportable at the top of a television camera and projecting beyond the front thereof; the driving member being carried by said base; a script take-up roll connected to said driving member and mounted on said base; a script supply roll connected to said base; and a front vertical frame extending downwardly in front of the camera and adjacent the lens in use; said frame comprising guide means for said moving script in front of the camera between the supply and take-up rolls; said front vertical frame being connected to said horizontal base for vertical adjustment with respect thereto.

6. A television program control system comprising a transmitter control box, a plurality of television cameras, and a plurality of receiving units; each receiving unit being mounted on a television camera; a script roll in said control box; and a similar script roll in each of said receiving units; apparatus for moving successive portions of the script roll in the control box into view; and means at the control box driven at a speed proportional to the rate of movement of the script roll in the control box; a driving member at each receiving unit moving successive portions of the script roll thereof into view adjacent an operating lens thereof; said operating lens being mounted on each of said television cameras; and a synchronizing connection between said driven means and each driving member to move the script roll at each receiving unit at a rate identical with that of the script roll in the control box; each receiving unit comprising a horizontal base supportable at the top of a television camera and projecting beyond the front thereof; the driving member being carried by said base; a script take-up roll connected to said driving member and mounted on said base; a script supply roll connected to said base; and a front vertical frame extending downwardly in front of the camera and adjacent the lens in use; said frame comprising guide means for said moving script in front of the camera between the supply and take-up rolls; said front vertical frame being connected to said horizontal base for vertical and horizontal adjustment with respect thereto.

7. A television program control system having a television camera for the broadcast of a scene; said television camera comprising a receiver having material thereon for the broadcast, means for mounting said receiver immediately adjacent a camera lens and in the line of vision of the actor in the scene being taken, said camera lens being mounted on the front of said television camera; and remotely disposed means for controlling the operation of said receiver for continuously changing the material thereon.

8. A television program control system having a television camera for the broadcast of a scene; said television camera comprising a receiver having material thereon for the broadcast, means for mounting said receiver so that its screen is in the line of vision of the actor in the scene being taken but hidden from the view of the audience, and remotely disposed means for controlling the operation of said receiver for continuously changing the material thereon.

9. A television program control system having a television camera for the broadcast of a scene; said television camera comprising a receiver having material thereon for the broadcast, means for mounting said receiver immediately adjacent a camera lens and in the line of vision of the actor in the scene being taken, said camera lens being mounted on the front of said television camera; and remotely disposed means for controlling the operation of said receiver for continuously changing the material thereon, said last means being a selsyn motor and a member having the identical material for broadcast as on said receiver and said receiver including a selsyn motor connected to and controlled by said transmitter selsyn.

10. A television program control system having a television camera for the broadcast of a scene; said television camera comprising a receiver having material thereon for the broadcast, means for mounting said receiver immediately adjacent a camera lens and in the line of vision of the actor in the scene being taken, said camera lens being mounted on the front of said television camera; and remotely disposed means for controlling the operation of said receiver for continuously changing the material thereon, said last means being a selsyn motor and a member having the identical material for broadcast as on said receiver and said receiver including a selsyn motor connected to and controlled by said transmitter selsyn, and an indicator on said transmitter for identifying the material with the time of broadcast thereof.

11. A television program control system having a television camera for the broadcast of a scene; said television camera comprising a receiver having material thereon for the broadcast, means for mounting said receiver immediately adjacent a camera lens and in the line of vision of the actor in the scene being taken, said camera lens being mounted on the front of said television camera; remotely disposed means for controlling the operation of said receiver for continuously changing the material thereon, said last means being a selsyn motor and a member having the identical material for broadcast as on said receiver and said receiver including a selsyn motor connected to and controlled by said transmitter selsyn, an indicator on said transmitter for identifying the material with the time of broadcast thereof, and an indicator at said transmitter for indicating when said selsyn motors are energized and operating.

12. A television program control system having a television camera for the broadcast of a scene; said television camera comprising a receiver having material thereon for the broadcast, means for mounting said receiver immediately adjacent a camera lens and in the line of vision of the actor in the scene being taken, said camera lens being mounted on the front of said television camera; remotely disposed means for controlling the operation of said receiver for continuously changing the material thereon, said last means being a selsyn motor and a member having the identical material for broadcast as on said receiver and said receiver including a selsyn motor connected to and controlled by said transmitter selsyn, an indicator on said transmitter for identifying the material with the time of broadcast thereof, and indicators for indicating a second receiver when said selsyns are operating.

13. A television program control system having a television camera for the broadcast of a scene; said television camera comprising a receiver having material thereon for the broadcast, means for mounting said receiver immediately adjacent a camera lens and in the line of vision of the actor in the scene being taken, said camera lens being mounted on the front of said television camera, so that the vertical axes of said television camera lens and said receiver are coincident, remotely disposed means for controlling the operation of said receiver for continuously changing the material thereon, said last means being a selsyn motor and a member having the identical material for broadcast as on said receiver and said receiver including a selsyn motor connected to and controlled by said transmitter selsyn, an indicator on said transmitter for identifying the material with the time of broadcast thereof, an indicator at said transmitter for indicating when said selsyn motors are energized and operating, and indicators for indicating a second receiver when said selsyns are operating.

MARY M. THIELEN.

REFERENCES CITED

The following references are of record in the file of this patent:

UNITED STATES PATENTS

| Number | Name | Date |
|---|---|---|
| 1,066,090 | Edmunds | July 1, 1913 |
| 1,135,040 | Missbach | Apr. 13, 1915 |
| 1,381,711 | Kriepel | June 14, 1921 |
| 2,467,051 | Reffner | Apr. 12, 1949 |
| 2,477,673 | Weisman | Aug. 2, 1949 |